United States Patent [19]

Stimson

[11] 3,857,469

[45] Dec. 31, 1974

[54] IMPROVEMENTS IN COMPOSITE ARTICLES

[75] Inventor: Ian Leonard Stimson, Rugby, England

[73] Assignee: Dunlop Limited, London, England

[22] Filed: Oct. 30, 1972

[21] Appl. No.: 301,818

[30] Foreign Application Priority Data
Nov. 4, 1971 Great Britain.................... 51277/71

[52] U.S. Cl...... 192/107 M, 188/73.2, 188/218 XL, 188/251 A
[51] Int. Cl..................... F16d 69/00, F16d/69/04
[58] Field of Search....... 192/109 A, 109 B, 107 M, 192/106.2; 188/218 XL, 73.2, 251 A

[56] References Cited
UNITED STATES PATENTS

| | | |
|---|---|---|
| 3,672,936 | 6/1972 | Ehrenreich................ 192/107 M X |
| 3,712,428 | 1/1973 | Marin......................... 192/107 M X |
| 3,730,320 | 5/1973 | Freeder et al.................. 192/107 M |
| 3,731,769 | 5/1973 | Ely............................. 192/107 M X |
| 3,759,353 | 9/1973 | Marin......................... 192/107 M X |
| 3,759,354 | 9/1973 | Dowell et al.................. 188/73.2 X |
| 3,761,231 | 9/1973 | Dowell et al.............. 192/107 M X |

Primary Examiner—Samuel Scott
Assistant Examiner—Lance W. Chandler
Attorney, Agent, or Firm—Stevens, Davis, Miller & Mosher

[57] ABSTRACT

A composite article, particularly suitable for use as a friction member for a brake or clutch, comprising a wearable element of relatively weak or brittle material clamped to a relatively strong backing member by a separately formed spigot and fastening device extending through the spigot, the spigot being reinforced by filamentary carbon and arranged to enter an aperture in the wearable element, of which the following is a specification.

18 Claims, 8 Drawing Figures

IMPROVEMENTS IN COMPOSITE ARTICLES

This invention relates to composite articles, and particularly, but not exclusively, to friction members for brakes and clutches.

Materials used in brake friction elements may have relatively weak structural properties, and problems arise in attaching such elements to the relatively strong backing members which have to be provided to enable braking loads to be transmitted. This problem is particularly acute in aircraft brakes where weight and volume are frequently at a premium and the thickness of the friction elements is therefore kept to a minimum. In aircraft brakes very high temperatures are often encountered and this tends to restrict the choice of friction materials available to the designer. One material which is particularly difficult to secure satisfactorily to a backing member is carbon, which, on account of its good frictional properties and high specific heat is otherwise a particularly attractive material for use in an aircraft brake.

One object of the present invention is to provide a brake member incorporating friction pads of carbon or other weak or brittle material in which the pads are securely fixed to a relatively strong backing member.

According to one aspect of the present invention, a composite article comprises a wearable element of relatively weak or brittle material clamped to a relatively strong backing member by a separately formed spigot and a fastening device extending through the spigot, the spigot being reinforced by filamentary carbon and arranged to enter an aperture in the wearable element.

According to a further aspect of the present invention a friction member for a brake or clutch comprises a friction element clamped to a backing member by a separately formed spigot and a fastening device extending through the spigot, the spigot being reinforced by filamentary carbon and arranged to enter an aperture in the friction element.

Preferably, in order to minimize wear, the spigot should be formed from a material whose wear characteristic is compatible with that of the wearable element or friction element. The term "compatible" in this sense should be understood to indicate that the spigot material is such that the spigot does not produce excessive wear of any cooperating surface which engages the wearable element or friction element.

The present invention also provides a disc brake incorporating a friction member in accordance with the present invention.

Several embodiments of the present invention will now be described by way of example with reference to FIGS. 1 to 8 of the accompanying drawings in which.

Figure 1:
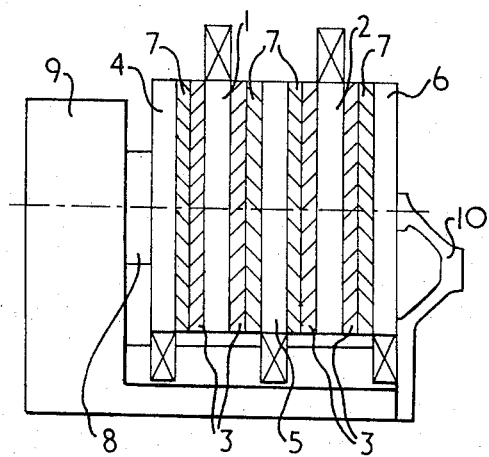
FIG. 1 is a sectional view of part of an aircraft multi-plate disc brake incorporating interleaved friction members in accordance with the present invention.

A multi-plate aircraft wheel disc brake, as shown in FIG. 1, comprises a number of interleaved friction members, in accordance with the present invention, in the form of two annular rotor discs 1 and 2 provided with carbon friction elements 3 and three non-rotatable annular stator discs 4, 5 and 6 provided with carbon friction elements 7.

The rotor discs 1 and 2 are arranged to be keyed at their outer peripheries to a rotatable portion of the aircraft wheel, while stators 4, 5 and 6 are similarly keyed at their inner peripheries to a non-rotatable annular support 9.

The disc brake is arranged to be actuated by a series of circumferentially spaced hydraulic cylinders 8 supported in annular non-rotatable support 9. The cylinders are arranged to act on stator disc 4 thereby axially compressing the interleaved rotor and stator arrangement, the rotors and stators being free to slide axially on their peripheral keys, against pressure plate 10 which directly supports stator 6 against axial movement and provides the required reaction force to sandwich the rotor and stator arrangement thereby achieving the required braking effect.

As the construction of the rotor and stator discs and their associated friction element assemblies are basically the same only the constructional details of the rotor and its associated friction element assemblies will be described in detail.

Figure 2:
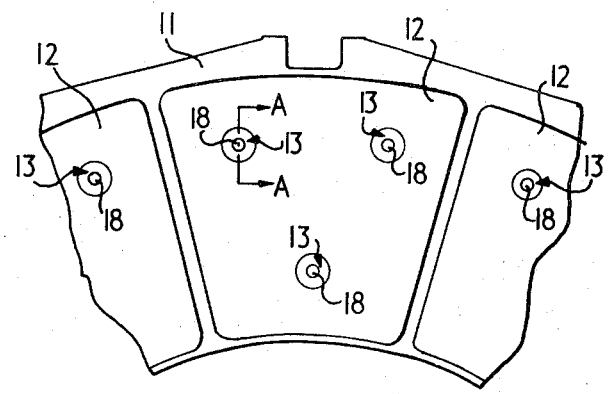
FIG. 2 is a side view of part of a rotatable friction member of the form shown in FIG. 1.

A side view of part of an annular rotor disc and friction element assembly of the form shown in FIG. 1 is shown in FIG. 2. The rotor disc 11 may be formed from any suitable material, such as for example beryllium, steel or a carbon fiber reinforced carbon composite, and acts as a backing member and heat sink for the carbon based friction elements 12 secured thereto.

The carbon based friction elements secured to the rotor disc take the form of segmental-shaped pads secured to each side of the disc, the pads being arranged in axially aligned pairs. These pads may be reinforced, by for example filamentary carbon or other known suitable means, or alternatively may be without reinforcement depending on the intended operating conditions of the brake.

Each pad is secured to the disc by three spigots 13 arranged in a spaced-apart triangular formation on the pad so as to support the shear loading during use of the friction member in a disc brake and to maintain intimate contact between the pad and the disc.

Figure 3:
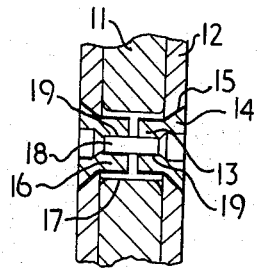
FIG. 3 is a sectional view on the line A—A of FIG. 2.

FIG. 3 shows the manner in which the spigots secure the pads to the disc. Each spigot has a conical head portion 14 which engages a concial aperture 15 in the associated pad. The other cylindrical end 16 of each spigot extends into a clearance socket 17 in the rotor disc. The spigots which secure each pair of pads to the disc are also arranged in axially-aligned pairs, each pair extending into the same rotor socket. The spigots each extend almost half-way through the rotor disc, each axially aligned pair being secured together by means of rivets 18 passing through aligned holes 19 in the spigots, thereby clamping the pads against the disc. A screw, nut and bolt or other similar fastening device may replace rivet 18.

The rivet heads are counter-sunk within the spigots so that they are below the lowest level to which the pad friction surface will be allowed to wear during operation, thereby ensuring that the rivet heads will not at any time cut into the friction surface of the cooperating pads.

With the arrangement shown in FIGS. 2 and 3 the shear load acting on pads 12 during use is transmitted to the conical spigots 13 and hence to rotor 11 mainly by loading the pad material in compression.

In order to give maximum support to the pad material and ensure maximum use of the thickness of pad it is desirable that the spigot head should, initially or at an early stage during the pad life, become flush with the friction surface of the pad and that the spigot should be formed from a material compatible with the friction material thus allowing the spigot to become part of the wearable friction surface of the pad without interference with the friction or wear characteristics of the pad surface.

In order to provide the necessary strength to withstand the steady and shock pad shear loads and at the same time offer the facility for the spigot to form part of the pad friction surface the spigot may conveniently be formed from a carbon matrix reinforced by filamentary carbon. The filamentary carbon reinforcement may take the form of substantially axially extending carbonized fibers, or alternatively may comprise a carbonized helical winding or a continuous fiber giving the desired cylindrical and conical forms. As a further alternative to the use of carbonized fibers the filamentary reinforcement may take the form of carbonized laminations of cloth or a felt. For example, a continuous circumferential winding of cloth may be used, or alternatively, cloth laminations extending in planes substantially parallel to the longitudinal axis of the spigot may be employed. If a carbonized felt reinforcement is utilized the felt fibers can, if desired, be compressed in a radial sense in order to confer some degree of axial alignment on their clockwise random orientation.

Depending on the intended operating temperature range and usage the spigots may be used with the matrix, in an initially uncarbonized state as carbonization of the head portion will take place in situ when the head portion becomes part of the pad friction surface. The use of initially uncarbonized matrix is, in general, only possible when the spigots are to be used in the lower operating temperature ranges.

The clearances provided between each axially aligned pair of spigots and between individual spigots and the sockets in the disc allow for differential thermal expansion during operation and also for manufacturing tolerances, thus ensuring, when the pads are clamped to the disc, that the head portion of each spigot makes full contact with the associated pad.

Figure 4:
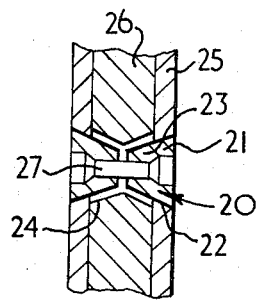

In an alternative form of the invention shown in FIG. 4 each spigot 20 is conical in form, the larger diameter head portion 21 engaging a tapered aperture 22 in the associated pad 25 and the smaller diameter end 23 of the spigot extending within a double-tapered clearance socket 24 in the rotor disc 26. The spigots are again arranged in axially aligned pairs and are clamped together by a rivet 27, or other suitable clamping means, extending within the spigots.

Figure 5:
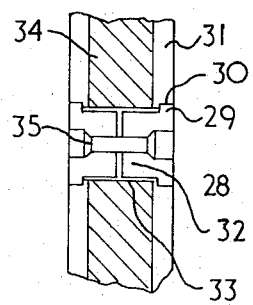
FIGS. 4 and 5 are sectional views on the same line as FIG. 3 of alternative forms of spigot attachment used in friction members in accordance with the present invention.

In a further form of the invention shown in FIG. 5 each spigot 28 is provided with a stepped head portion 29 which engages a stepped aperture 30 in the associated pad 31. The other end 32 of the spigot extends within a clearance socket 33 in the rotor disc 34. The spigots are again arranged in axially aligned pairs and are clamped together by a rivet 35, or other suitable clamping means, extending within the spigots.

Figure 6:
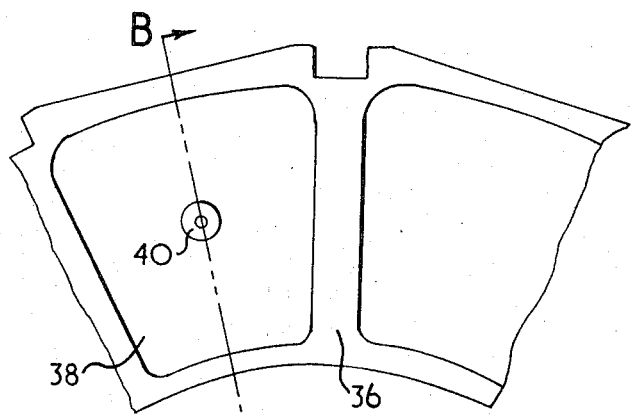
FIG. 6 is a side view of part of a further form of friction member in accordance with the present invention.
Figures 7, 8:
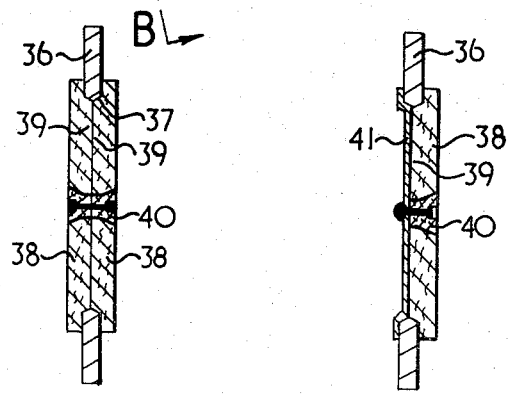
FIG. 7 is a sectional view on the line B—B of FIG. 6 showing one form of spigot attachment suitable for use in a friction member in which brake pads are provided on both sides.
FIG. 8 is a sectional view on the line B—B of FIG. 6 showing one form of spigot attachment suitable for use in a friction member in which brake pads are provided on one side only.

FIGS. 6 to 8 show an alternative form of the present invention in which the rotor disc is reduced in weight and therefore is of less significance as a heat sink while the friction elements are increased in weight to act as an additional heat sink. This type of construction gives a weight advantage when the specific heat of the disc is less than that of the friction elements.

The rotor disc 36 shown in FIGS. 6 to 8 incorporates a series of circumferentially spaced apertures or windows 37, a segmental-shaped carbon friction pad 38 being recessed into each window. The rear face of each carbon pad is provided with a projection 39 which is arranged to be a close fit in the associated rotor window. The carbon pads are again arranged in axially aligned pairs when it is desired to provide pads on both sides of the disc, the projections on the rear faces of the pads of each pair being arranged to touch.

The carbon pads are retained in position by one or more pairs of tapered or stepped headed spigots 40 of the form previously described with reference to FIGS. 3, 4 and 5.

In the construction shown in FIGS. 6 to 8 the spigots are primarily designed to hold the carbon pads in position rather than to transmit to the disc the shear load acting on the pads during use. The shear loads are primarily transmitted to the disc from the pads by the projections which are a close fit in the disc windows. The projections are preferably of tapered form so that the carbon pad material is primarily loaded in compression.

FIG. 8 shows a suitable arrangement for attaching carbon pads 38 to one side of a disc 36 using a series of retaining plates 41, on the other side of the disc, to which the carbon pads may be riveted or otherwise secured using any of the spigot arrangements shown in FIGS. 3 to 5.

In any of the above examples any number of spigots may be provided, in accordance with operational requirements, to secure the pads to the rotor disc. For example, two spigots may be arranged in spaced-apart positions on a circumferential line having a radius equal to the mean radius of the disc.

Further, although all the friction member constructions described above employ separate spigots, it will be understood by those skilled in the art that the spigots although initially separately formed may, at some stage of the manufacture or assembly of a friction member in accordance with the present invention, be bonded to the friction elements.

The various friction members in accordance with the present invention described above enable friction elements of relatively weak material, such as carbon, to be secured to a variety of suitable backing members without the break-up of the friction element material surrounding the spigots, thus producing a friction member providing high heat capacity, good friction properties and a low weight.

The invention is also applicable to other composite articles where a relatively weak material has to be secured to a strong backing plate, for example to electrical brush gear incorporating carbon contact elements.

The various references throughout this specification to "carbon" should be understood to include all suitable forms of carbon including graphite.

Having now described my invention, what I claim is:

1. A friction member for a brake or clutch comprising a friction element having at least one aperture through the element and spaced from the peripheral edges thereof, and a metal backing member, the aperture having an enlarged end remote from the backing member, the material of the friction element being more brittle and of higher specific heat than that of the backing member, the friction element being clamped to the backing member by a spigot located in said aperture with its axis normal to the plane of the friction element and a fastening device extending from one end of the spigot through the backing member, the other end of the spigot being enlarged and co-operating with the enlarged end of the aperture to prevent displacement of the friction element away from the backing member, the spigot being reinforced by filamentary carbon and being of a material compatible with that of the friction element.

2. A friction member according to claim 1 in which the aperture in the friction element is conical and the enlarged end of the spigot is a corresponding conical head portion arranged to enter the aperture thus clamping the friction element to the backing member.

3. A friction member according to claim 1 in which the end of the spigot from which the fastening device extends is cylindrical in form and is arranged to enter a corresponding socket formed in the backing member.

4. A friction member according to claim 1 in which the entire spigot is conical in form its larger diameter end engaging a corresponding conical aperture in the friction element and its narrower diameter entering a corresponding conical socket in the backing member.

5. A friction member according to claim 1 in which the enlarged end of the spigot is in the form of a stepped head portion which engages a corresponding stepped aperture in the friction element, the end of the spigot from which the fastening device extends entering a corresponding socket in the backing member.

6. A friction member according to claim 2 in which a number of circumferentially spaced friction elements are clamped on one side of an annular backing member.

7. A friction member according to claim 1 in which a number of circumferentially spaced friction elements are clamped on either side of an annular backing member in axially aligned pairs, the spigots and fastening devices clamping the friction elements to the backing members also being arranged in axially aligned pairs, each axially aligned pair of spigots entering a common socket extending through the backing member, the friction elements and the spigots being of a similar carbonaceous material.

8. A friction member according to claim 1 in which a number of circumferentially-spaced friction elements are clamped on one side of an annular backing member, the rear face of each friction element having a projection entering a corresponding aperture in the backing member, each friction element being clamped to the backing member by at least one spigot and fastening device extending through the friction element and secured to a retaining plate which extends adjacent the side of the backing member remote from the friction element, the friction elements and the spigots being of a similar carbonaceous material.

9. A friction member according to claim 1 in which a number of circumferentially-spaced friction elements are clamped on either side of an annular backing member in axially aligned pairs, the rear face of each friction element having a projection entering a corresponding aperture in the backing member, the spigots and fastening devices clamping the friction elements to the backing member also being arranged in axially aligned pairs, the friction elements and the spigots being of a similar carbonaceous material.

10. A friction member according to claim 1 in which the friction element is of carbonaceous material and the spigot is formed from material comprising a carbon matrix and a filamentary carbon reinforcement.

11. A friction member according to claim 1 in which the friction member is of carbonaceous material and the spigot is formed from material comprising an initially uncarbonized matrix and a filamentary carbon reinforcement.

12. A friction member according to claim 10 in which the filamentary carbon reinforcement takes the form of substantially axially extending fibers.

13. A friction member according to claim 10 in which the filamentary carbon reinforcement takes the form of a carbonized helical winding of a continuous fiber.

14. A friction member according to claim 10 in which the filamentary carbon reinforcement takes the form of carbonized laminations of cloth.

15. A friction member according to claim 14 in which the cloth laminations take the form of a continuous circumferential winding.

16. A friction member according to claim 14 in which the cloth laminations extend in planes substantially parallel to the longitudinal axis of the spigot.

17. A friction member according to claim 10 in which the filamentary carbon reinforcement takes the form of a carbonised felt.

18. A friction member according to claim 17 in which during the manufacture of each spigot the felt is subjected to a radially inward compression in order to confer some degree of axial alignment on the otherwise random orientation of the felt fibers.

* * * * *